(12) United States Patent
Steger

(10) Patent No.: US 11,927,760 B2
(45) Date of Patent: Mar. 12, 2024

(54) LOW PRESSURE MOLDED ARTICLE AND METHOD FOR MAKING SAME

(71) Applicant: Stephen Andrew Steger, Santa Monica, CA (US)

(72) Inventor: Stephen Andrew Steger, Santa Monica, CA (US)

(73) Assignee: Snap Inc., Santa Monica, CA (US)

( * ) Notice: Subject to any disclaimer, the term of this patent is extended or adjusted under 35 U.S.C. 154(b) by 521 days.

(21) Appl. No.: 17/221,995

(22) Filed: Apr. 5, 2021

(65) Prior Publication Data

US 2021/0223556 A1    Jul. 22, 2021

Related U.S. Application Data

(63) Continuation of application No. 16/206,310, filed on Nov. 30, 2018, now Pat. No. 10,969,594.

(51) Int. Cl.
*G02C 1/00* (2006.01)
*B29C 45/14* (2006.01)
(Continued)

(52) U.S. Cl.
CPC .... *G02B 27/0176* (2013.01); *B29C 45/14065* (2013.01); *G02C 5/001* (2013.01);
(Continued)

(58) Field of Classification Search
CPC ........ B29C 45/14065; B29C 45/14467; B29C 45/14418; B29C 45/14639; B29C 45/77;
(Continued)

(56) References Cited

U.S. PATENT DOCUMENTS

| 4,125,247 A | 11/1978 | Gabrys |
| 4,490,315 A | 12/1984 | Charlebois et al. |

(Continued)

FOREIGN PATENT DOCUMENTS

| AU | 2001270550 A1 | 3/2002 |
| CA | 2162224 A1 | 5/1996 |

(Continued)

OTHER PUBLICATIONS

1st Chinese Office Action for Chinese Application No. 201980078895.1 dated Jul. 12, 2022 (dated Jul. 12, 2022)—8 pages, English summary—2 pages.

(Continued)

*Primary Examiner* — Mahidere S Sahle
(74) *Attorney, Agent, or Firm* — Culhane Meadows PLLC; Stephen J. Weed

(57) ABSTRACT

An article includes a hollow enclosure defining a void. The void has a first section and a second section separate from the first section. An electronic component is housed in the first section and the second section of the void. A low pressure mold material is molded into the first section of the void and cured around a first segment of the electronic component to encapsulate the first segment of the electronic component. A support seal is inserted into the second section of the void adjacent a second segment of the electronic component. The support seal defines a sealing barrier on one side of the low pressure mold material that limits the flow of low pressure mold material out of the first section of the void.

20 Claims, 6 Drawing Sheets

(51) Int. Cl.
  *G02B 27/01* (2006.01)
  *G02C 5/00* (2006.01)
  *G02C 11/00* (2006.01)
  *B29D 12/02* (2006.01)
  *B29K 77/00* (2006.01)
  *B29L 12/00* (2006.01)

(52) U.S. Cl.
  CPC .............. *G02C 11/10* (2013.01); *B29D 12/02* (2013.01); *B29K 2023/06* (2013.01); *B29K 2077/00* (2013.01); *B29L 2012/005* (2013.01); *G02B 2027/0178* (2013.01)

(58) Field of Classification Search
  CPC ........ B29C 45/14344; B29C 45/14819; B29C 2045/14131; B29D 12/02; B29K 2023/06; B29K 2077/00; B29L 2012/005; B29L 2031/3475; G02B 27/0176; G02B 2027/0178; G02C 5/001; G02C 11/10
  USPC .................. 264/239, 250, 260; 351/41–178
  See application file for complete search history.

(56) References Cited

U.S. PATENT DOCUMENTS

| | | |
|---|---|---|
| 5,885,680 A | 3/1999 | Levillain et al. |
| 6,302,673 B1 | 10/2001 | Frechette et al. |
| 9,738,040 B2 | 8/2017 | Meschenmoser et al. |
| 10,444,515 B2 | 10/2019 | Nikkhoo et al. |
| 10,486,347 B2 | 11/2019 | Teramae et al. |
| 10,969,594 B2 | 4/2021 | Steger |
| 11,000,976 B2 | 5/2021 | Fäcke et al. |
| 2005/0142315 A1 | 6/2005 | DeSimone et al. |
| 2006/0162156 A1 | 7/2006 | Reed |
| 2014/0264977 A1 | 9/2014 | Pugh et al. |
| 2015/0080989 A1 | 3/2015 | Mohn et al. |
| 2016/0209659 A1 | 7/2016 | Nikkhoo et al. |
| 2016/0211587 A1 | 7/2016 | Yamazaki et al. |
| 2017/0312960 A1 | 11/2017 | Bertini et al. |
| 2018/0022000 A1 | 1/2018 | Ferniani et al. |
| 2018/0119848 A1 | 5/2018 | Nishino et al. |

FOREIGN PATENT DOCUMENTS

| | | |
|---|---|---|
| CN | 104760308 A | 7/2015 |
| CN | 105609144 A | 5/2016 |
| CN | 107209339 A | 9/2017 |
| EP | 0713248 A2 | 5/1996 |
| EP | 1123792 A1 | 8/2001 |
| EP | 3245051 A1 | 11/2017 |
| GB | 201709725 A | 6/2017 |
| JP | 2004351794 A | 12/2004 |
| WO | 9714024 A1 | 4/1997 |
| WO | 2008024761 A2 | 2/2008 |
| WO | 2012068527 A2 | 5/2012 |
| WO | 2018145085 A1 | 8/2018 |

OTHER PUBLICATIONS

Chinese notice of Allowance for Chinese Application No. 201980078895.1 dated Sep. 27, 2022 (dated Sep. 27, 2022)—5 pages.

International Search Report and Written Opinion for International Application No. PCT/US2019/061397, dated Feb. 5, 2020 (dated Feb. 5, 2020)—16 pages.

LOW PRESSURE MOLDED ARTICLE AND METHOD FOR MAKING SAME

CROSS-REFERENCE TO RELATED APPLICATIONS

This application is a Continuation of U.S. application Ser. No. 16/206,310 entitled LOW PRESSURE MOLDED ARTICLE AND METHOD FOR MAKING SAME, filed on Nov. 30, 2018, which is incorporated herein by reference in its entirety.

FIELD

The present disclosure relates generally to methods and apparatuses that utilize low pressure injection molding during production, and in particular to articles that incorporate thermoplastic materials to encapsulate and protect fragile components inside the articles.

BACKGROUND

Various types of articles are manufactured with sensitive electronics incorporated inside the article to perform specific functions. Eyewear used in augmented reality (or "AR") is one example. AR is a live direct or indirect view of a physical, real-world environment whose elements are augmented (or supplemented) by computer-generated images, such as video or graphics. Users view their environment through eyewear that incorporates an AR display system. The AR display system includes fragile electronics, including flexible printed circuit boards, that are typically housed inside the eyewear frame. The eyewear frame is typically formed as a plastic enclosure, although other materials can also be used to manufacture the frame.

Fragile electronics that are housed in hollow articles must be protected from moisture, dust, vibration and other environmental factors that can damage the electronics. To protect fragile electronics from damage, a hot melt material such as polyamide or polyolefin can be injected into the eyewear frame and around the electronics during manufacture. The hot melt material is injected at low pressure into the eyewear frame and around the electronics in an over-molding process, often referred to as "low pressure molding". During this process, the temperature of the injected hot melt material is high enough that the hot melt material has a low viscosity and can flow easily around the electronics. The temperature of the injected hot melt is not high enough to damage the electronics or melt the plastic material forming the eyewear frame, however. After the hot melt material flows around the electronics, it quickly cools and hardens. The cooled material encapsulates the electronics to protect them from moisture, dust, vibration and other damaging environmental factors.

SUMMARY

Drawbacks and challenges encountered with low pressure molding processes are resolved in many respects by a sealing insert and an article incorporating a sealing insert in accordance with the present disclosure.

In one embodiment, an article includes a hollow enclosure defining a void, the void having a first section and a second section separate from the first section. An electronic component is contained in the first section and the second section of the void. The electronic component has first and second portions or segments. A low pressure mold material is injected into the first section of the void and cured around a first segment of the electronic component to encapsulate the first segment of the electronic component. A support seal is contained in the second section of the void adjacent the second segment of the electronic component. The support seal defines a sealing barrier on one side of the low pressure mold material.

The support seal in the article can include a first side and a second side opposite the first side, and further define an aperture that is open on at least the first side of the support seal.

The second segment of the electronic component can extend into the aperture such that the support seal fixes the position of the second segment relative to the hollow enclosure.

The support seal can sealingly engage (i.e. form a seal against) the second segment of the electronic component in the aperture.

The aperture in the support seal can be open only on the first side of the support seal.

The aperture in the support seal can be formed as a blind bore.

The aperture in the support seal can be open on the first side and the second side of the support seal.

The aperture in the support seal can be formed as a through-hole extending through the first side and the second side of the support seal.

The support seal can also include a third side that interconnects the first side with the second side. Moreover, the aperture can be open on the first side, the second side and the third side of the support seal.

The aperture can form a longitudinal slot through the support seal, the longitudinal slot intersecting the first side, the second side and the third side of the support seal.

At least one of the first side and the second side of the support seal can define a glue well.

The low pressure mold material in the article can be sealed off from the second section of the void by the support seal.

The void can include a third section, and the support seal can be positioned between the first section of the void and the third section of the void so that the third section of the void is sealed off from the low pressure mold material.

The article can be formed by placing a hollow enclosure into a low pressure mold, the enclosure having a void with a first section and a second section.

The article can also be formed by inserting an electronic component into the hollow enclosure, the electronic component having a first segment and a second segment.

The article can also be formed by placing a support seal in the second section of the void so that the support seal supports and maintains the second segment of the electronic component in a fixed position in the void.

The article can also be formed by closing the low pressure mold around the hollow enclosure.

The article can also be formed by injecting a hot melt material into the low pressure mold and inside the first section of the void of the hollow enclosure to encapsulate the first segment of the electronic component in the first section of the void, the support seal limiting the flow of the hot melt material into the second section of the void.

The article can also be formed by opening the low pressure mold.

The article can also be formed by removing the hollow enclosure from the low pressure mold.

The article can also be formed by sealingly engaging the support seal with the second segment of the electronic component.

The article can also be formed by sealing off the hot melt material from the second section of the void by using the support seal.

The article can also be formed by removing the support seal from the second section of the void after removing the hollow enclosure from the low pressure mold.

BRIEF DESCRIPTION OF THE DRAWINGS

The present disclosure is best understood from the following detailed description when read in connection with the accompanying drawings. The various features of the drawings are not drawn to scale unless otherwise indicated. Included in the drawings are the following figures, of which.

DETAILED DESCRIPTION

Numerous details are set forth in the following detailed description by way of examples in order to provide a thorough understanding of the relevant teachings. However, it should be apparent to those skilled in the art that the present teachings may be practiced without such details, or with the details featured in different arrangements, orders, and/or combinations.

The applicant has discovered that it can be desirable to control the flow and shape of low pressure mold material after it is injected into a hollow enclosure or article. For example, there may be areas in an article where it is not desirable to have the holt melt material flow. Stopping the flow of hot melt material can sometimes be accomplished by including a wall feature in the article. However, adding a plastic wall in the article can cause cosmetic defects, particularly if the frame is formed as a thin walled enclosure.

Another option is to include some type of wall feature in the low pressure mold. However, a wall feature in the low pressure mold can make it difficult to position components, such as electronics, inside the article. A wall feature in the low pressure mold can also damage fragile components placed in the article when the mold is closed. Moreover, if design changes are made to the article, it can be costly and impractical to modify the tooling used in the low pressure mold.

In some circumstances, it is important to place a component in a certain position inside a hollow article and maintain that position. Electronic components, like flexible circuit boards, are often much smaller than the enclosures that surround them. Without some form of restraint, the position of the component is uncontrolled, which can result in the component being fixed in an undesirable location after low pressure molding.

Figure 1:
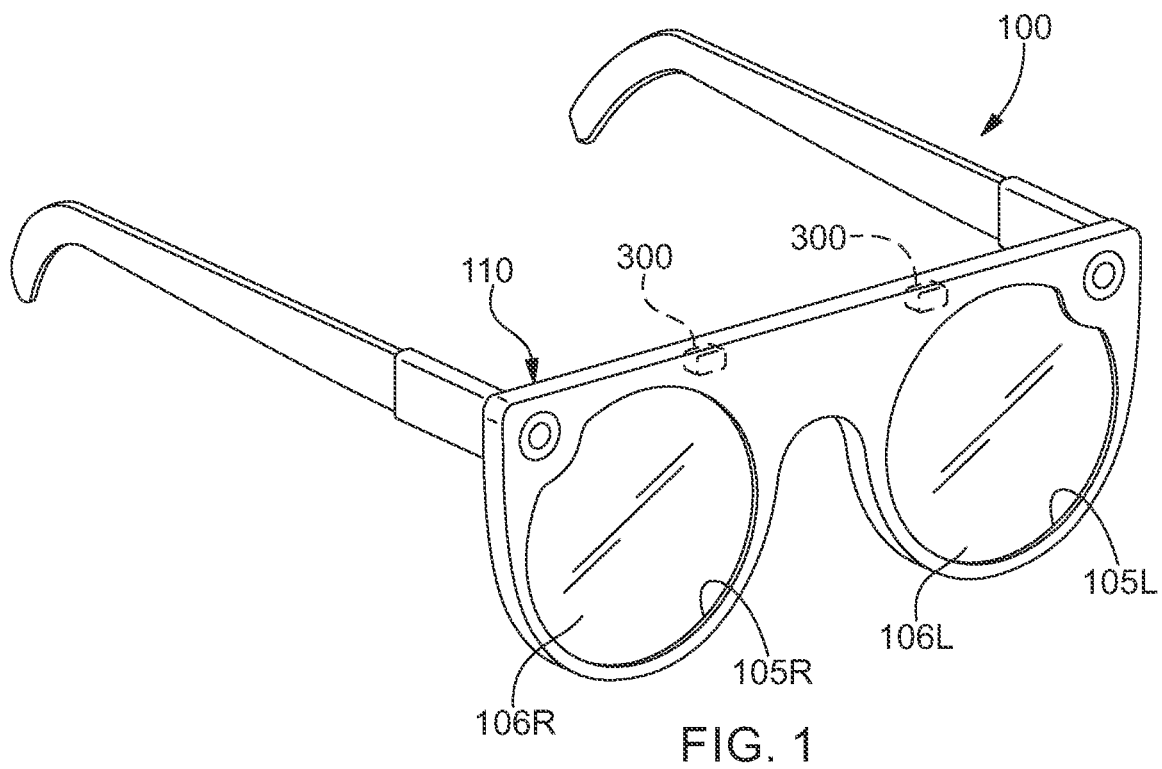
FIG. 1 is a perspective view of an article that incorporates support seals in accordance with the present disclosure.
Figure 2:
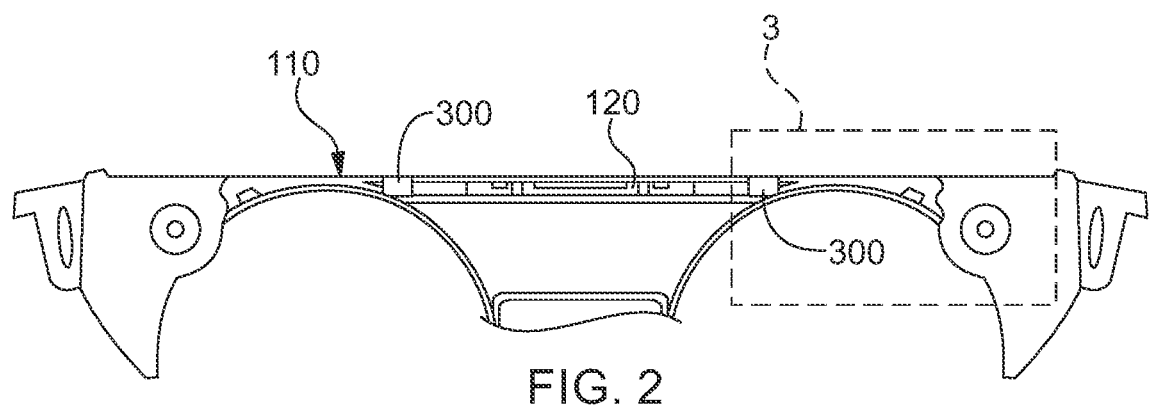
FIG. 2 is a truncated front view of a frame portion or "frame" of the article of FIG. 1, the frame partially shown in cross section.

Referring to FIGS. 1 and 2, an eyewear frame for augmented reality eyewear, or "frame" 100, is shown in accordance with one example of the present disclosure. Frame 100 includes a first aperture 105L for supporting a first waveguide or lens 106L, and a second aperture 105R for supporting a second waveguide or lens 106R. Frame 100 also includes a hollow body or enclosure 110 designed to house electronics. Enclosure 110 may be made out of metal or plastic. In addition, enclosure 110 may be manufactured using a conventional process, such as injection molding. Enclosures in accordance with the present disclosure can include one or more internal cavities or voids that provide storage spaces and conduits for the electronics. In the present example, enclosure 110 defines an internal void 120.

Figure 3:
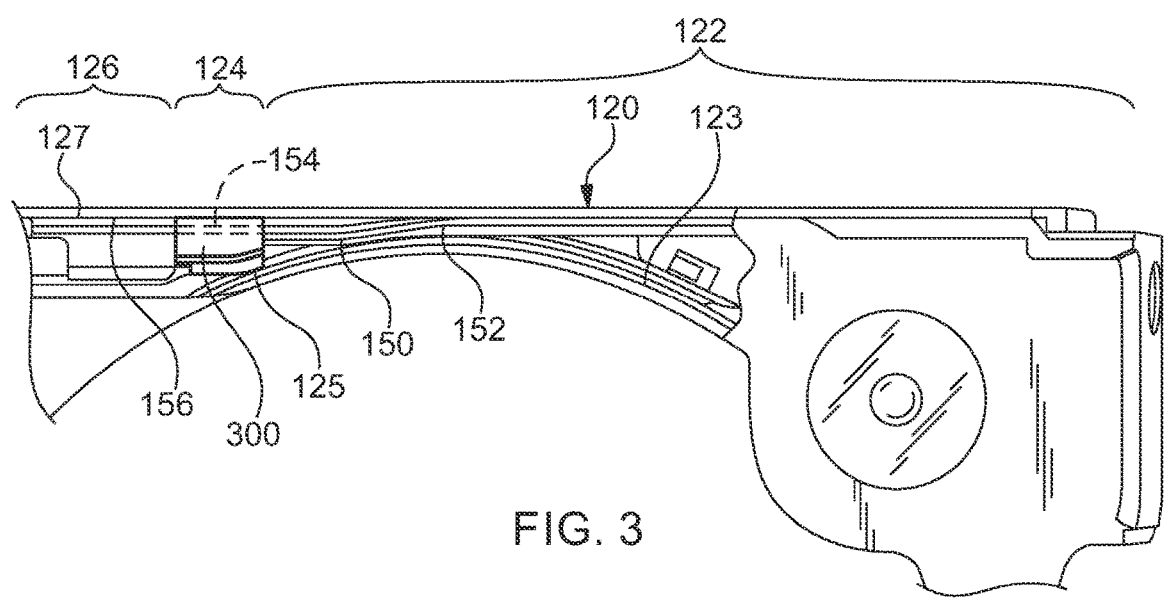
FIG. 3 is a magnified front view of the frame of FIG. 2, partially shown in cross section, prior to injection of a low pressure mold material.
Figure 4:
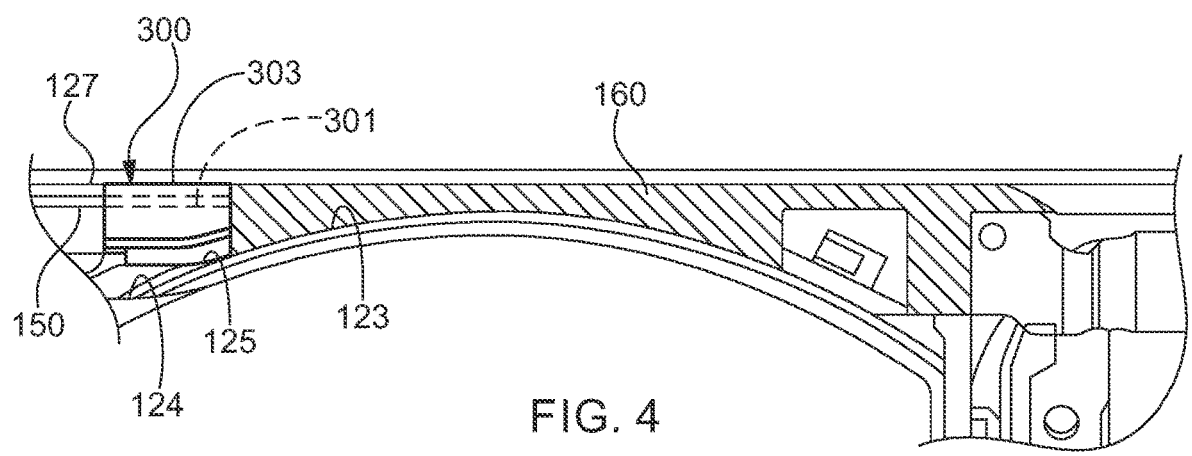
FIG. 4 is another magnified front view of the frame of FIG. 2, partially shown in cross section, after injection of a low pressure mold material.
Figure 5:
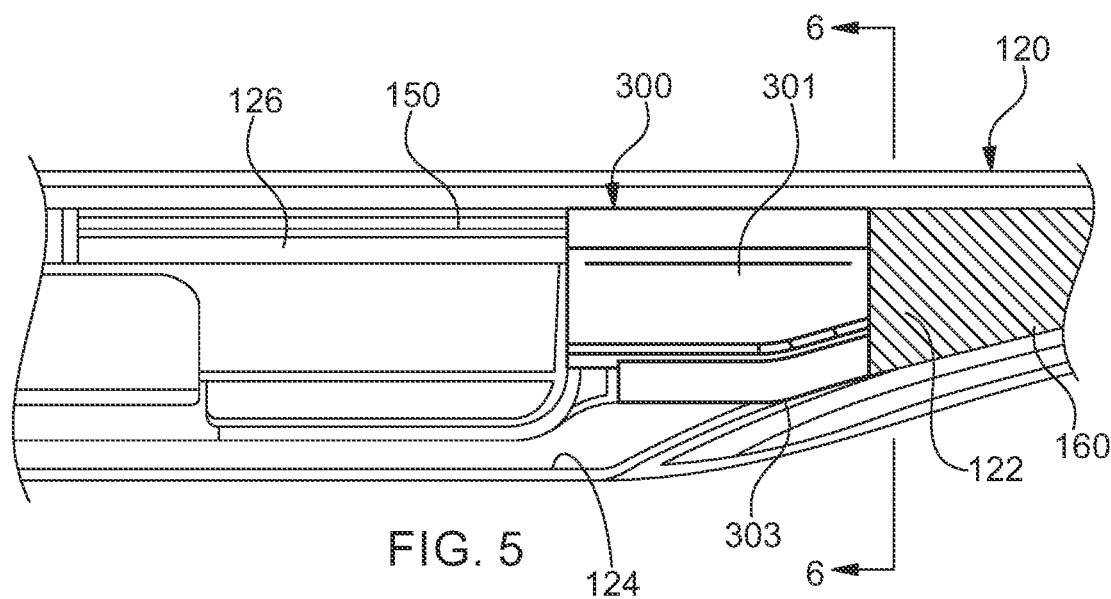
FIG. 5 is another magnified front view of the frame of FIG. 2, partially shown in cross section, after injection of a low pressure mold material.

Cavities or voids can be subdivided into sections, with some performing specific functions. For example, a specific section of a void may be selected to house a specific electronic component and receive a low pressure mold material that encapsulates and protects the electronic component. Referring to FIG. 3, for example, void 120 is divided into three different sections extending in series along a length of frame 100. The three sections include a first section 122, a second section 124 bordering first section, and a third section 126 bordering the second section, as shown. A flexible printed circuit board or "FPCB" 150 extends through all three sections 122, 124, 126 of void 120. In particular, FPCB 150 has a first segment 152 extending through first section 122, a second segment 154 extending through second section 124, and a third segment 156 extending through third section 126. FPCB 150 is bent and fitted into of void 120.

First segment 152, second segment 154 and third segment 156 of FPCM 150 form a relatively thin elongated member extending through first section 122, second section 124 and third section 126 of void 120. First section 122 of void 120 is defined by a first sidewall 123 that surrounds first segment 152. Similarly, second section 124 of void 120 is defined by a second sidewall 125 that surrounds second segment 154. Third section 126 of void 120 is defined by a third sidewall 127 that surrounds third segment 156. The cross sectional dimensions of first, second and third segments 152, 154, 156 are much smaller than the surrounding spaces defined by first sidewall 123, second sidewall 125 and third sidewall 127, respectively. Without some form of protection, the relatively large volume of space surrounding FPCB 150 can leave the FPCB in an unstable position and exposed to elements such as dirt, dust and moisture that could enter enclosure 110.

To stabilize the position of FPCB 150 and protect it from damaging elements, frame 100 includes a low pressure mold material or "LPM" material 160 molded around first segment 152. A variety of hot melt materials can be used as the LPM material, such as Polyamide, Polyolefin or other suitable LPM material. LPM material 160 is cured around first segment 152 of FPCB 150 to encapsulate the first segment. This encapsulation stabilizes first segment 152 so that it is not free to move relative to first sidewall 123. In addition, the encapsulation protects and seals first segment 152 from the environment so that dirt, dust, moisture and other adverse elements cannot contact the first segment.

It is often desirable to limit the flow of LPM material into an enclosure during injection, as noted earlier. Frames according to the present disclosure utilize an economical solution prior to injecting LPM material that effectively stops the flow of LPM material without expensive and impractical modifications to the enclosure or mold. The solution is provided by one or more support seals that are inserted into one or more sections of the enclosure prior to low pressure molding. Each support seal has an outer geometry that fits within the inner geometry of a section of the void. As will be explained, the outer geometry can match the inner geometry of the void section to form a tight seal against the inner wall of the enclosure around that section. The seal can limit or prevent the flow of LPM material into the second section. Support seals can be made of a variety of materials, including but not limited to elastomers. A variety of elastomers can be used, including but not limited to compression molded silicone, and any thermoset elastomer or thermoplastic elastomer with a melt temperature above the melt temperature of the LPM material being used.

Support seals according to the present disclosure can be designed to form a complete seal against the inner wall of the void section in which they are placed. Where a complete seal is desired, the body of the support seal can have a geometry that matches the geometry of the void section in which it is placed. As such, a support seal according to the present disclosure can have a block shape, a wedge shape, a cylindrical shape, or any three-dimensional polygonal or non-polygonal shape that matches the geometry of the void section in which it is placed. The outer geometry can be shaped and sized to fit snugly against the inner wall of the void section and form a seal on each side of the support seal.

Support seals according to the present disclosure can also be designed to form a complete seal around electronics or other components around which they are placed. Where a complete seal is desired, the body of the support seal can have an inner geometry to match the geometry of the component(s) around which it is positioned. Inner geometries can be defined by one or more hollowed sections or apertures designed to partially or completely surround a component. Hollowed sections according to the present disclosure can include, but are not limited to, one or more apertures in the form of holes, bores, channels, grooves, slots, recesses or any combination thereof that are defined in the body of the support seal. Apertures according to the present disclosure can extend partially into the body of the support seal and terminate inside the body. Such apertures can be open on only one side of the support seal. Alternatively, apertures according to the present disclosure can extend through the support seal and be open on multiple sides of the support seal. The inner geometry defined by each hollowed section or aperture can be shaped and sized to fit snugly against the component around which the support seal is placed, and form a seal on each side of the component.

Thus far, support seals have been described in applications where it is desired to form a complete seal against the inner wall of the void, and a complete seal around components. In some applications, it may be desirable to only form a partial seal against the inner wall and/or the component. That is, it may be desirable to allow some of the LPM material to flow around the support seal, or flow through the support seal in a controlled manner. For example, it may be desirable to inject LPM material into a first void section and a second void section that is isolated from the first void section, but not fill the space between the two void sections with LPM material. In such an application, the support seal can be designed to form a seal against the inner wall on some but not all sides of the support seal, thereby allowing the LPM material to flow around the support seal on the side(s) that are not sealed. In addition, or in the alternative, the support seal can be designed with an aperture that allows LPM material to flow through the support seal. For example, the aperture can be designed to allow LPM material to enter into a first side of the seal, flow through a small area within the seal, exit a second side of the seal different from the first side of the seal, and flow into an enclosed area adjacent the second side of the seal. In such applications, the support seal establishes a conduit for channeling LPM material between two separate void sections in the frame body without filling the space in between the two void sections.

In the present example, eyewear frame 100 contains two support seals 300, with a first support seal located above first aperture 105L in the frame, and a second support seal located above second aperture 105R in the frame. Referring to FIGS. 3-6, each support seal 300 has a body 301 made of a compliant compression molded silicone material. Body 301 is specifically designed to provide a sealing barrier in second section 124 of void 120 by sealingly engaging inner wall 125 of the second section, and by sealingly engaging second segment 154 of FPCB 150. To sealingly engage inner wall 125 of second section 124, support seal 300 has an outer geometry 303 that conforms to the shape of the inner wall. In particular, the outer dimensions of support seal 300 are equal to or larger than the corresponding dimensions of second section 124, so that the support seal fits snugly against inner wall 125. Support seal 300 also has an inner geometry 305 that conforms to the shape of second segment 154 of FPCB 150. In particular, the inner dimensions of support seal 300 are equal to or larger than the corresponding dimensions of FPCB 150, such that the support seal fits snugly around second segment 154. In this arrangement, support seal 300 establishes a first seal 300A with inner wall 125 and establishes a second seal 300B with FPCB 150. First seal 300A and second seal 300B prevent LPM material 160 injected into first section 122 of void 120 from entering into second section 124 and third section 126. Support seal 300 consequently defines one boundary past which the LPM material 160 cannot flow.

Figure 7:
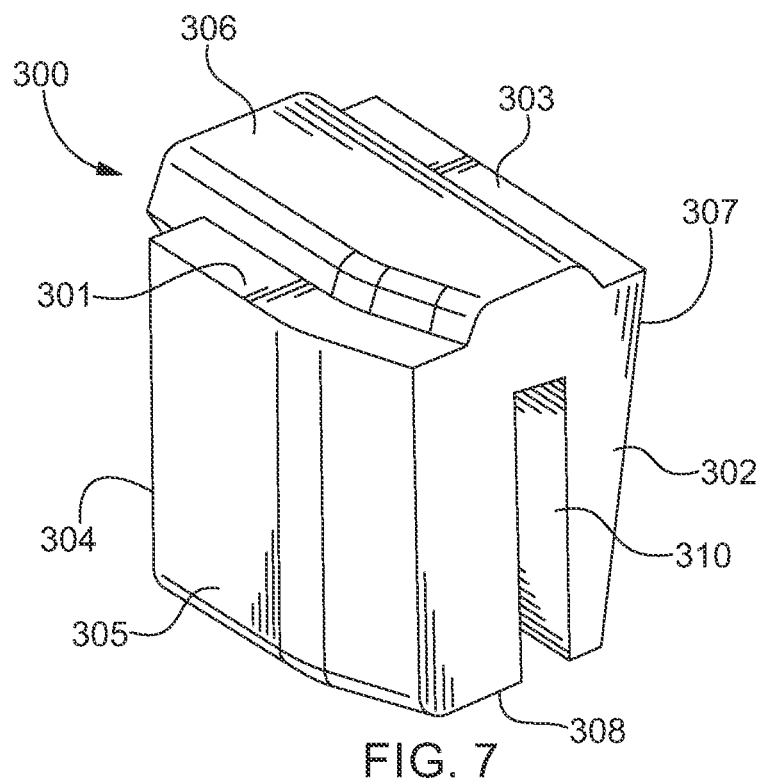
FIG. 7 is a perspective view of a support seal incorporated into the article of FIG. 1.
Figure 8:
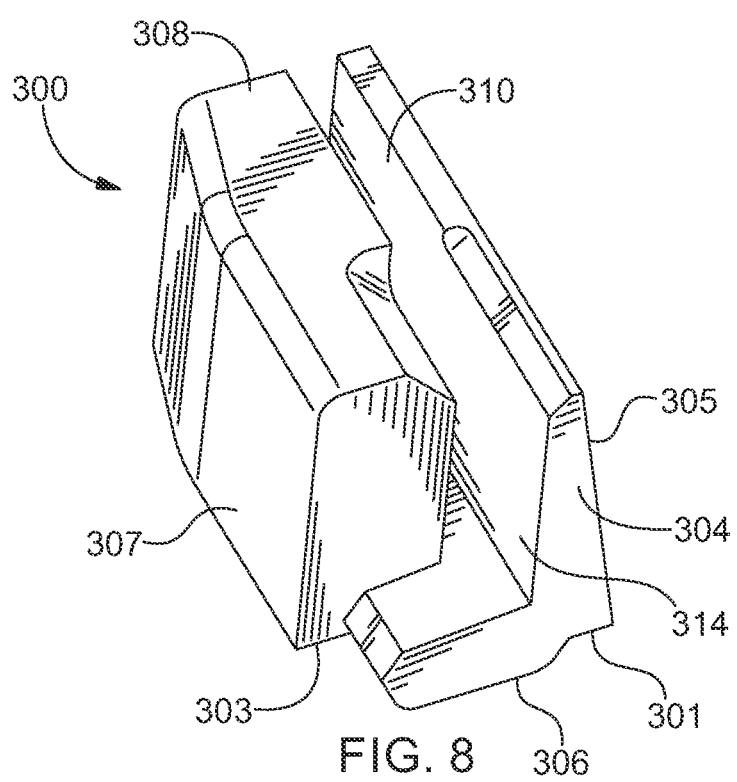
FIG. 8 is another perspective view of the support seal incorporated into the eyewear of FIG. 1.

Referring to FIGS. 7 and 8, body 301 of support seal 300 has a first side 302 and a second side 304 opposite the first side. First side 302 and second side 304 are connected to one another by third side 305, fourth side 306, fifth side 307 and sixth side 308. Body 301 defines an aperture in the form of a slot 310. Slot 310 is open on first side 302, second side 304 and sixth side 308 of body 301. In this arrangement, slot 310 extends completely through support seal 300.

Third side 305, fourth side 306, fifth side 307 and sixth side 308 of body 301 collectively define outer geometry 303 of body 301. As noted above, outer geometry 303 is shaped to match the geometry of second section 124 of void 120. In particular, outer geometry 303 features a tapered or wedge shape in which the width dimension of body 301 is at a maximum at fourth side 306 and gradually decreases toward sixth side 308. This tapered shape conforms to the geometry in second section 124 of void 120. Outer geometry 303 also has outer dimensions that are equal to or larger than the corresponding dimensions of second section 124, so that support seal 300 fits snugly against inner wall 125.

Slot 310 defines an inner geometry 314 of support seal 300. Inner geometry 314 is shaped to match the geometry of second segment 154 of FPCB 150 and second section 124 of void 120. In particular, slot 310 has an L-shape (seen best in FIG. 8) that conforms to and accommodates second segment 154 of FPCB 150 and a rib that extends from inner wall 125. Inner geometry 314 also has inner dimensions that are equal to or smaller than the corresponding dimensions of second segment 154 and the rib, so that support seal 300 fits snugly into void 120 around FPCB 150.

Second segment 154 of FPCB 150 fits snugly into slot 310. The elastomeric material of support seal 300 gently presses against second segment 154 like a clamp to fix the position of the second segment relative to inner wall 125 of enclosure 110. This holds second segment 154 of FPCB 150 in a relatively centered position in second section 124 of void 120 prior to injecting LPM material 160 into enclosure 110. With this snug fit, support seal 300 sealingly engages second segment 154 of FPCB 150 to prevent LPM material 160 from flowing into slot 310 and entering second and third sections 124, 126 of void 120.

Support seals with various outer geometries and inner geometries are contemplated, and need not be limited to the specific outer and inner geometries shown in the present example. The outer geometry can be a function of the geometry of the void section in which the support seal is placed. Similarly, the inner geometry can be a function of the geometry of the component around which the support seal is placed. The inner geometry can also be designed to provide a particular type of support for a component. For example, the inner geometry can be designed to allow the component to extend through the support seal. Alternatively, inner geometry can be designed such that an end of the component is enclosed within the body of the seal. In the former example, the aperture may be in the form of a through-bore that extends through the support seal and is open on opposite sides of the support seal. In the latter example, the aperture may be in the form of a blind bore that is open on only one side of the body and terminates inside the body of the support seal.

Figure 9:
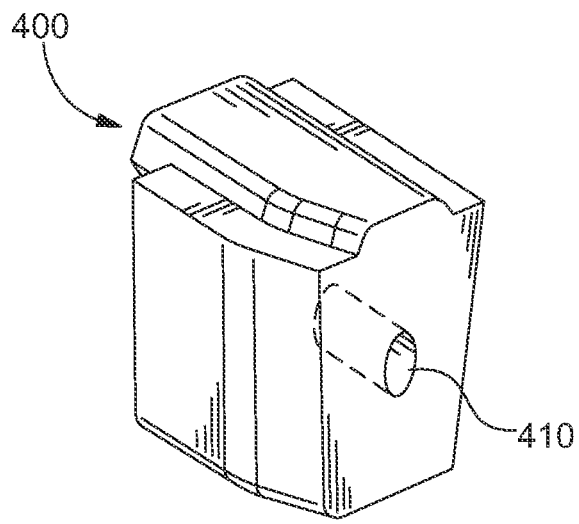
FIG. 9 is a perspective view of a support seal in accordance with a second embodiment of the present disclosure.
Figure 10:
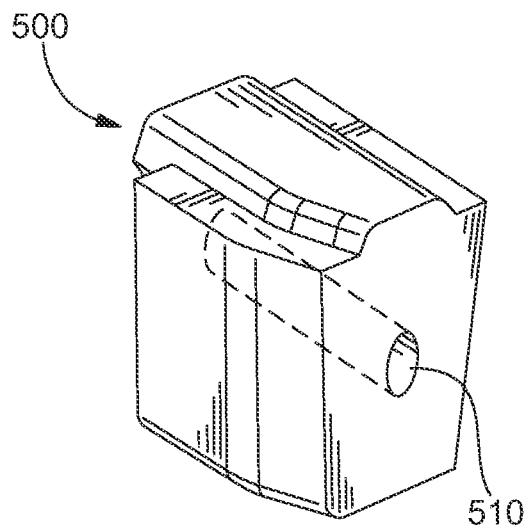
FIG. 10 is a perspective view of a support seal in accordance with a third embodiment of the present disclosure.
Figure 11:
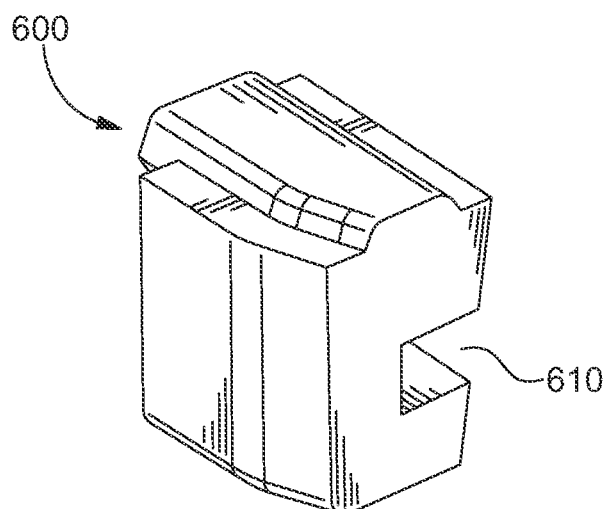
FIG. 11 is a perspective view of a support seal in accordance with a fourth embodiment of the present disclosure.
Figure 12:
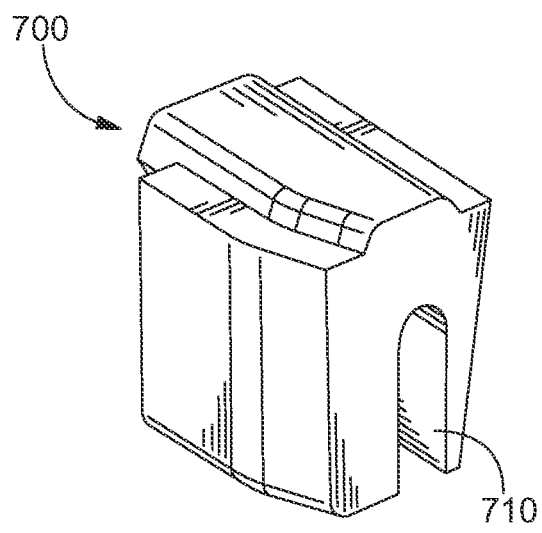
FIG. 12 is a perspective view of a support seal in accordance with a fifth embodiment of the present disclosure.

FIGS. 9-12 show alternative examples of support seals with different inner geometries according to the present disclosure. FIG. 9 shows a support seal 400 that defines a blind bore 410. Blind bore 410 extends through one side of support seal 400 and terminates in the interior before exiting the opposite side. FIG. 10 shows a support seal 500 that defines a through bore 510. Through bore 510 extends through one side of support seal 500 and completely through the support seal, exiting the opposite side. FIG. 11 shows a support seal 600 that defines a rectangular slot 610 that extends along one side of the support seal. FIG. 12 shows a support seal 700 that defines a rounded or U-shaped slot 710 extending along one side of the support seal. The embodiments in FIGS. 9-12 represent non-limiting examples and are described with the understanding that an infinite number of other outer and inner geometries are contemplated within the scope of the present disclosure.

Support seals according to the present disclosure can be configured to form a permanent part of a finished product. When used as a permanent part of an AR frame, the support seal not only assists with fixing a component in place and controlling the flow of LPM material, but also assists with subsequent assembly steps. Referring back to FIG. 6, for example, support seal 300 is shown holding second section 154 of FPCB 150 in place after LPM material 160 is injected. Support seal 300 is shown from the perspective of looking into enclosure 110 from first section 122 of void 120. For clarity, LPM material 160 is not shown in front of support seal 300 in this view. Enclosure 110 is shown prior to attachment of an exterior housing piece P that will be glued onto the open side of the enclosure as shown. Support seal 300 includes recessed areas 313 that are positioned to be directly beneath exterior housing piece P as the exterior housing piece is glued to frame 100. Recessed areas 313 form a glue well 315 that provides a place for excess glue to flow. That is, when exterior housing piece P is pressed onto frame 100, glue well 315 provides free space beneath the exterior housing piece in which excess glue can disperse. This free space collects excess glue and prevents it from seeping back out of enclosure 110 through seams and onto exterior surfaces of frame 100.

Referring back to FIGS. 4 and 5, FPCB 150 extends into third section 126 of void 120. Support seal 300 seals off second section 124 from the flow of LPM material 160. Since support seal 300 is positioned between first section 122 and third section 126, the support seal also seals off the third section from the flow of LPM material.

In some instances, it may be desirable to remove the support seal from the enclosure after LPM material is injected into the enclosure. Reasons for removing the support seal may be include a desire or need to reuse the support seal, and/or a desire or need to reduce the weight of the finished product. In such instances, the support seal can be pulled out of the open side of the frame after the frame is removed from the low pressure mold, and before attaching an exterior housing piece over the open side of the enclosure. Although the support seal contacts the LPM material during the low pressure molding step, the LPM material does not bond well to the support seal, particularly when the support seal is made of an elastomeric material. This makes it relatively easy to remove the support seal from the enclosure.

Figure 13:
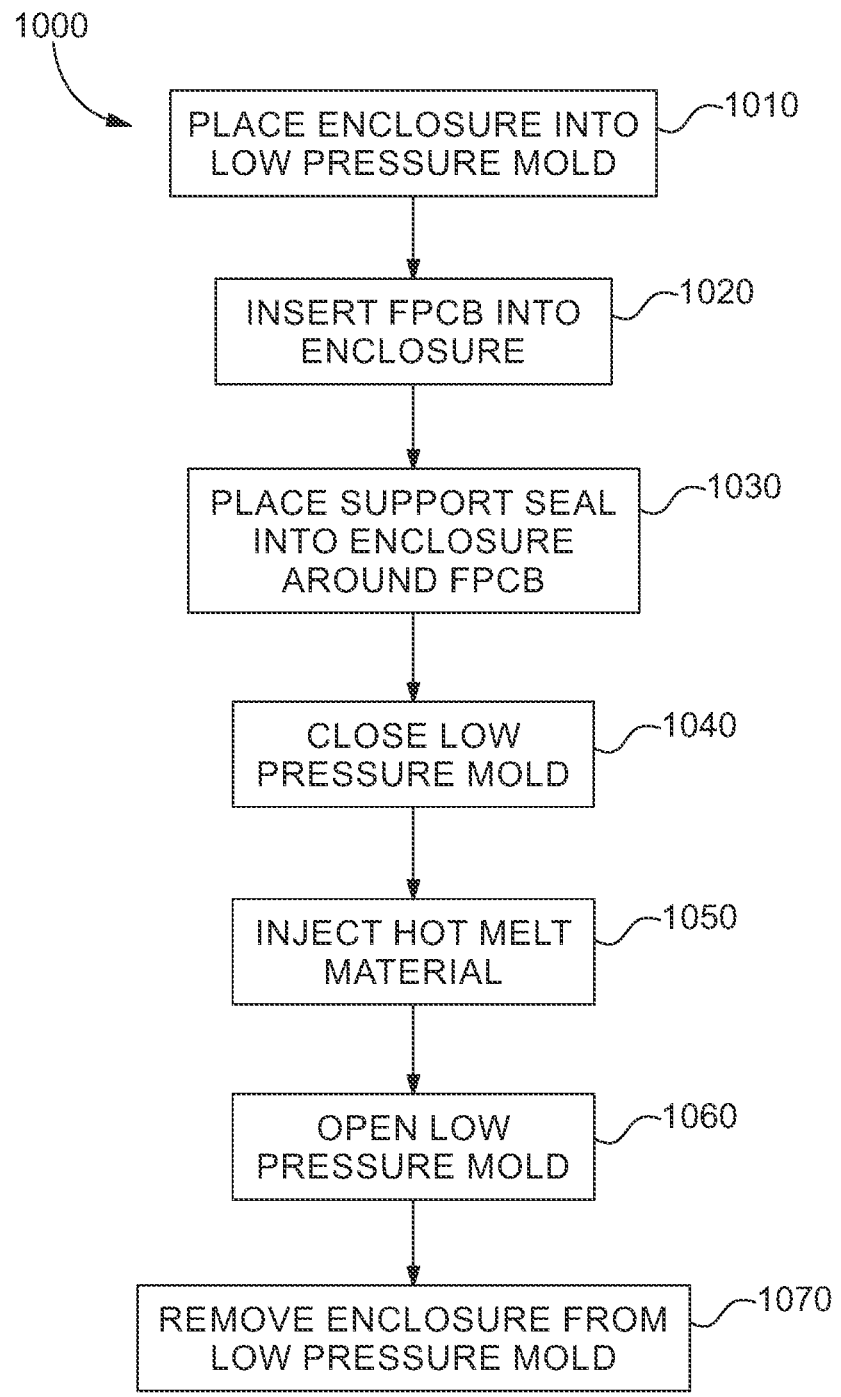
FIG. 13 is a block flow diagram illustrating a method for assembling an article according to the present disclosure, such as the frame shown in FIGS. 1-6.

Referring to FIG. 13, a method 1000 will now be described for assembling an article with one or more internal components. Method 1000 can be used to assemble hollow articles like frame 100 described previously, and other articles with internal components. In step 1010, a hollow enclosure is placed into a low pressure mold. The hollow enclosure may be in the form a hollow eyewear frame piece that is open on one side. The hollow frame piece defines an inner cavity or void for housing electronics. The void includes a first section and a second section different from the first section.

In step 1020, a fragile component, for example a flexible printed circuit board, is inserted into the hollow enclosure. The flexible printed circuit board has a first segment placed in the first section of the void, and a second segment placed in the second section of the void. The first and second segments are much smaller than the first and second sections of the void, such that the first and second segments are relatively exposed and free to move in the void.

In step 1030, a support seal is placed in the second section of the void and around the second segment of the flexible printed circuit board so that the support seal supports and maintains the second segment in a fixed position in the second section of the void.

In step 1040, the low pressure mold is closed around the hollow enclosure. After the low pressure mold is closed, a hot melt material is injected into the low pressure mold in step 1050. The hot melt material is injected inside the first section of the void of the hollow enclosure to encapsulate the first segment of the flexible printed circuit board in the first section of the void. During this stage, the support seal seals off the second section of the void, preventing the hot melt material from flowing into the second section of the void.

In step 1060, the low pressure mold is opened. In step 1070, the hollow enclosure is removed from the low pressure mold. At this stage, the support seal can be removed from the hollow enclosure, or left in the enclosure to assist in further assembly steps and become part of the finished product.

It will be understood that the above-described method can be performed in many different ways and in combination with additional steps, including steps performed before the described steps, in between some of the described steps, or after the described steps. Some of the described steps can also be performed in a different order or sequence than described.

It will also be understood that various modifications can be made to the examples described in this disclosure, and that the subject matter in this disclosure can be implemented in various forms. For example, the outer geometries and inner geometries of the support seal can be designed with various shapes and dimensions, as noted previously.

Figure 6:
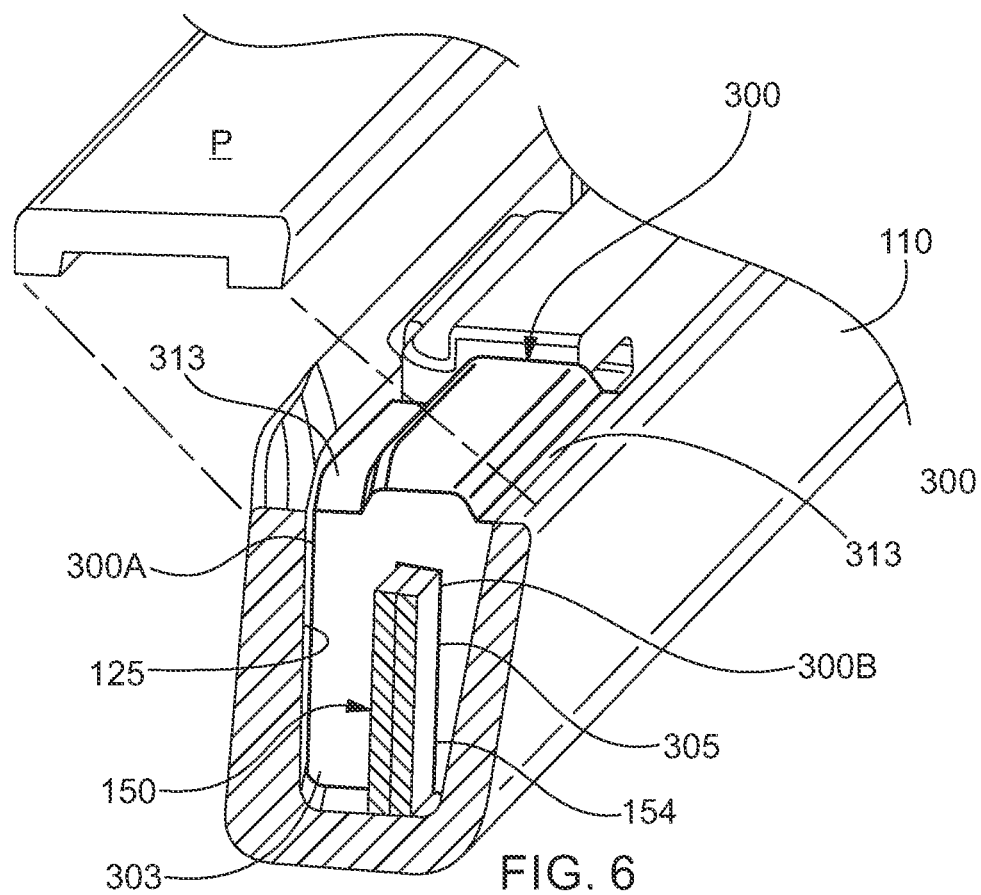
FIG. 6 is perspective view into cross section 6-6 of FIG. 5.

Support seals according to the present disclosure can also be placed at peripheral locations or ends of a void, and need not be placed between two sections of the void, like support seal 300. For example, an enclosure can have a void that extends through the wall of the enclosure, forming an opening on the exterior of the article. The "second section" of the void, where the support seal is placed, can terminate adjacent to the opening, so that the support seal is positioned more or less adjacent with the opening to seal the void from the outside. This type of arrangement would appear as shown in FIG. 6, assuming that the section break in the Figure represents an opening to the exterior of the enclosure, rather than an opening into the first section of the void. The support seal can be flush with the opening, or extend slightly past the end of the opening, or be recessed just short of the opening to form a shallow glue well.

It will be further understood that the teachings in the present disclosure can be applied to any article with one or more components that require protection from moisture, dust, vibration, shock or other damaging environmental factor. As such, the teachings of the present disclosure are not limited to eyewear, and are not limited to articles with internal electronics.

The following claims are intended to encompass any and all such modifications and variations that are contemplated within the present disclosure.

What is claimed:

1. Eyewear comprising:
   a frame including a first aperture configured to support a first lens, a second aperture configured to support a second lens, a first void above the first aperture, and a second void above the second aperture;
   a first support seal contained within the first void above the first aperture configured to provide a first sealing barrier in the first void that prevents low pressure mold (LPM) material flow from a first section of the first void to a second section of the first void; and
   a second support seal contained within the second void above the second aperture configured to provide a second sealing barrier in the second void that prevents LPM material flow from a first section of the second void to a second section of the second void.

2. The eyewear of claim 1, wherein at least one of the first and the second support seals comprises a first side and a second side opposite the first side, the at least one support seal further defining a seal aperture that is open on at least the first side of the support seal.

3. The eyewear of claim 1, wherein the first support seals comprises a first side and a second side opposite the first side, the first support seal further defines a seal aperture that is open on at least the first side of the support seal, and the eyewear further comprises:
   an electronic component contained in the first section and the second section of the at least one void;
   a LPM material molded into the first section of the first void and cured around a first segment of the electronic component to encapsulate the first segment of the electronic component;
   wherein the first support seal is positioned adjacent a second segment of the electronic component.

4. The eyewear of claim 3, wherein the second segment of the electronic component extends into the seal aperture such that the first support seal fixes the position of the second segment relative to the first void.

5. The eyewear of claim 4, wherein the first support seal sealingly engages the second segment of the electronic component in the seal aperture.

6. The eyewear of claim 3, wherein the seal aperture is only open on the first side of the first support seal.

7. The eyewear of claim 6, wherein the seal aperture is formed as a blind bore.

8. The eyewear of claim 3, wherein the seal aperture is open on the first side and the second side of the first support seal.

9. The eyewear of claim 8, wherein the seal aperture is formed as a through-hole extending through the first side and the second side of the first support seal.

10. The eyewear of claim 2, wherein the first support seal further comprises a third side that interconnects the first side with the second side, and wherein the seal aperture is open on the first side, the second side, and the third side of the first support seal.

11. The eyewear of claim 10, wherein the seal aperture forms a longitudinal slot through the first support seal, the longitudinal slot intersecting the first side, the second side, and the third side of the first support seal.

12. The eyewear of claim 2, wherein at least one of the first side and the second side of the first support seal defines a glue well.

13. The eyewear of claim 1, wherein the low pressure mold material is sealed off from the second section of the first void by the first support seal.

14. The eyewear of claim 1, wherein the first void comprises a third section, and the first support seal is positioned between the first section of the first void and the third section of the first void so that the third section of the first void is sealed off from the LPM material.

15. The eyewear of claim 1, wherein the support seal seals the first section of the void from an outside area external to the hollow enclosure.

16. A method for use in forming augmented reality eyewear, the augmented reality eyewear including a frame having an aperture configured to support a lens and a void above the aperture, the method comprising the steps of:

- placing the frame into a low pressure mold, the void having a first section and a second section different from the first section;
- inserting an electronic component into the void, the electronic component having a first segment placed into the first section of the void, and a second segment placed in the second section of the void;
- placing a support seal in the second section of the void such that the support seal supports and maintains the electronic component in a fixed position in the void;
- closing the low pressure mold around the frame;
- injecting a hot melt material into the low pressure mold and inside the first section of the void to encapsulate the first segment of the electronic component in the first section of the void, the support seal limiting the flow of the hot melt material into the second section of the void;
- opening the low pressure mold; and
- removing the frame from the low pressure mold.

17. The method of claim 16, wherein the support seal comprises a first side and a second side opposite the first side, the support seal further defines a seal aperture that is open on at least the first side of the support seal, and the support seal supports and maintains the position of the second segment of the electronic component in the seal aperture.

18. The method of claim 17, wherein the support seal sealingly engages the second segment of the electronic component in the seal aperture.

19. The method of claim 16, wherein the hot melt material is sealed off from the second section of the void by the support seal.

20. The method of claim 16, wherein the method further comprises:

- removing the support seal from the second section of the void after removing the frame from the low pressure mold.

* * * * *